Oct. 24, 1967  J. B. CARRASCO  3,348,591
SAW GUIDE ASSEMBLY
Filed Oct. 8, 1965
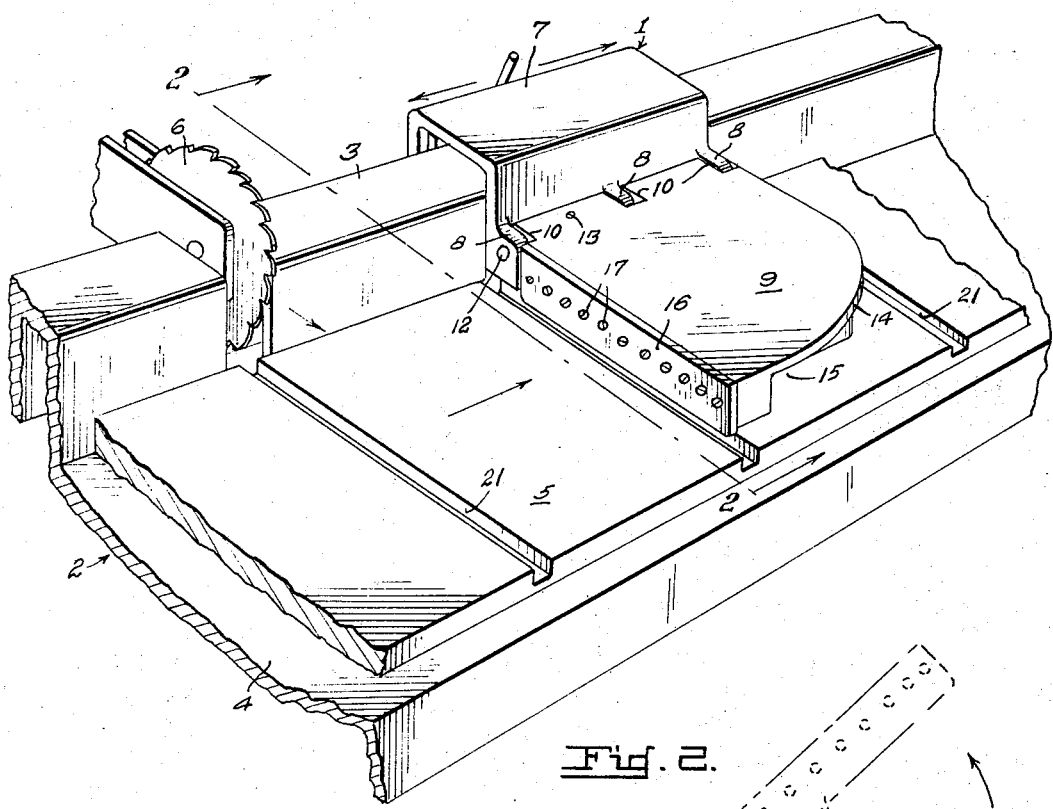
Fig. 1.
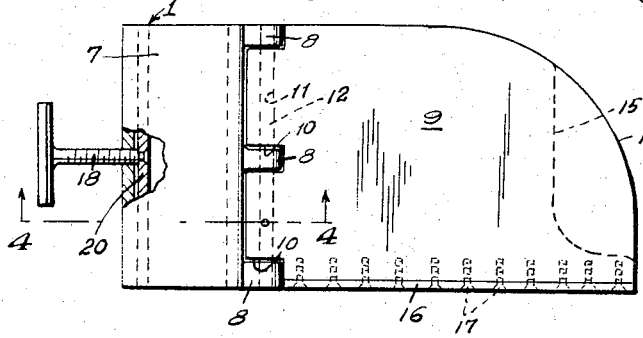
Fig. 2.
Fig. 3.
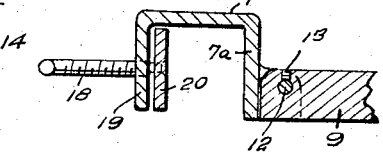
Fig. 4.
INVENTOR
Julio B. Carrasco
BY: Harry M. Saragovitz,
Edward J. Kelly &
A. J. Dupont    ATTORNEYS.

United States Patent Office 3,348,591
Patented Oct. 24, 1967

3,348,591
SAW GUIDE ASSEMBLY
Julio B. Carrasco, 381 Sherbundy St.,
Sierra Vista, Ariz. 85635
Filed Oct. 8, 1965, Ser. No. 494,286
4 Claims. (Cl. 143—168)

ABSTRACT OF THE DISCLOSURE

A saw guide for a radial type sawing machine having a guide strip, a flat table and a circular saw blade. A work abutting member is hinged to an adjustable member which slides on the guide strip whereby the work abutting member may be moved and set to selected points along the guide strip to provide a stop for cutting stock into multiple, even lengths.

---

The invention described herein may be manufactured and used by or for the Government for governmental purposes, without the payment to me of any royalty thereon.

This invention relates to a saw guide assembly and more particularly to a saw guide for use with a radial saw to accelerate multiple cutting of material into equal lengths accurately.

Heretofore, in making multiple cuts of material to the same length, it was necessary to measure out the lengths and draw or etch a line thereon for the number of cuts to be made, then cut along the lines as closely as is possible. This method was laborious and time consuming as well as resulting in numerous inaccurate cuts. Further, the aforesaid method resulted in spoilage of material and the resultant waste in discarding the material that was inaccurately cut.

The present invention precludes the possibility of inaccuracy in the cuts and insures that each cut made will result in the lengths being precisely the same.

The invention consists briefly, of an adjustable bracket to be attached to the guide strip of a radial saw of the De Walt type, which is well known on the market and is widely used in woodworking. The bracket has a hinged plate with a planar blade fixed on the cutting side. Once set, the device is used until another adjustment is to be made. The material is butted against the blade, then the plate and blade are lifted and the material remaining is butted again and another cut made.

It is therefore an object of this invention to provide a saw guide assembly, adjustable along the guide strip of a radial saw.

It is another object to provide a saw guide attached to an adjustable bracket having a hinged plate that may be lifted after each cut is made to move the length cut out of the way to make room for the next cut.

A further object is to provide a simple yet economical saw guide to accelerate multiple cutting of material into equal lengths.

These and other objects and advantages of the present invention will be more fully apparent from the following description when taken in connection with the annexed drawing in which:

FIG. 1 is a perspective view of the saw guide assembly attached to the guide strip of a radial sawing machine;

FIG. 2 is a cross section taken along line 2—2 of FIG. 1;

FIG. 3 is a top plan view of the saw guide per se; and

FIG. 4 is a detail section taken along line 4—4 of FIG. 3.

With reference to the drawing in detail, in which like numerals indicate like parts throughout the several views, the reference numeral 1 designates generally the saw guide assembly. A portion of a radial saw machine (FIG. 1) is indicated generally by 2.

The radial saw machine 2 includes a guide strip 3, a flat table 4, a grooved cutting block 5 and a circular saw bldae 6. (The remainder of the machine is not shown, since it is a standard item.)

The saw guide assembly 1 consists of an inverted U-shaped channel member 7 having a series of integral lugs 8 extending inwardly from its inner leg 7a and disposed at the bottom thereof.

A flat, substantially rectangular plate 9 is mitered out along its end adjacent to channel portion 7 as at 10 to provide notches and the remaining material is provided with a longitudinal bore 11. A hinge pin 12 is passed through lugs 8 and bore 11 to provide a hinge mounting of plate 9 on lugs 8 as best seen in FIG. 3.

Hinge pin 12 is retained in bore 11 by a set screw 13 (FIG. 4).

Plate 9 is rounded at one corner as at 14 and undercut along a bottom corner as at 15 to provide a finger hold for the manipulation thereof by the fingers of the operator.

A planar metal bar 16 is secured to the work engaging edge of plate 9 by screws 17.

An adjusting means for the saw guide assembly 1 is provided and comprises a hand screw 18 which is threadably engaged in the outer leg 19 of channel member 7 and is attached to a plate 20 which is disposed longitudinally within channel 7 as best seen in FIG. 2.

The operation is simple. Channel member 7 is slid along guide strip 3 to a position where a cut in the material (not shown) is desired. The channel member 7 is also set so that the plate 9 is in a position to be high enough to permit passage of the material under when lifted.

Then hand screw 18 is screwed in to push plate 20 inward to contact strip 3 and fix the assembly 1 against longitudinal movement along the guide strip 3.

The plate 9 is in "down" position and the material (not shown) is butted against plate 16 and the saw blade 6 is pulled in by a handle (not shown) to make a radial cut therethrough.

The block 5, being grooved as at 5 permits a clean cut through the material. (Block 21 is a standard item.)

Now the fingers of the operator (one hand) grasp plate 9 under finger hold 15 to lift plate 9 upwardly and the material cut is shoved under and past the assembly 1 and the material is butted again against plate 16 for the next cut.

As many cuts as desired may be made quite rapidly and with a minimum of effort and without further adjustment.

When the length of a cut is to be varied, the operation is repeated.

While only a preferred form of the invention is shown and described, other forms of the invention are contemplated and numerous changes and modifications may be made therein without departing from the spirit of the invention as set forth in the appended claims.

What is claimed is:

1. A saw guide assembly for use with a radial sawing machine including a guide strip, a flat table and a circular saw blade; said assembly comprising a sliding member adapted for slidable engagement on said guide strip; a flat substantially rectangular plate having a work engaging edge, there being an undercut portion along an inner corner of said plate for gripping said plate by the fingers of an operator for raising said plate from said plate; hinge means connecting said plate to said sliding member; a work abutting member secured to said work engaging edge of said plate and adjustable means carried by said sliding member for holding said assembly against sliding movement along said guide strip.

2. A saw guide assembly as set forth in claim 1 wherein said sliding member comprises an inverted U-shaped channel member including inner and outer downwardly extending legs.

3. A saw guide assembly as set forth in claim 1 wherein said hinge means comprises a series of inwardly extending lugs integral with the lower end of the inner side of said sliding member, a series of notches mitered in the outer end of said plate, there being a longitudinal bore through the remaining material of said plate and a longitudinal bore through each said lug and a hinge pin received in said bores whereby said plate may be lifted from a horizontal position with respect to said flat table to permit passage of cut material thereunder.

4. A saw guide assembly as set forth in claim 1 wherein said work abutting member comprises a planar metal bar secured to the work engaging edge of said plate.

References Cited

UNITED STATES PATENTS

| | | | |
|---|---|---|---|
| 1,583,964 | 5/1926 | Driggers | 143—168 |
| 2,850,058 | 9/1958 | Stoll | 143—174 |
| 3,090,615 | 5/1963 | May | 143—174 X |

WILLIAM W. DYER, Jr., *Primary Examiner.*

W. D. BRAY, *Assistant Examiner.*